Sept. 16, 1958     S. M. SHOBERT     2,852,425
HOLLOW GLASS ROD AND METHOD OF MAKING SAME
Filed Sept. 7, 1954     2 Sheets-Sheet 1
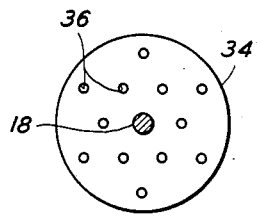
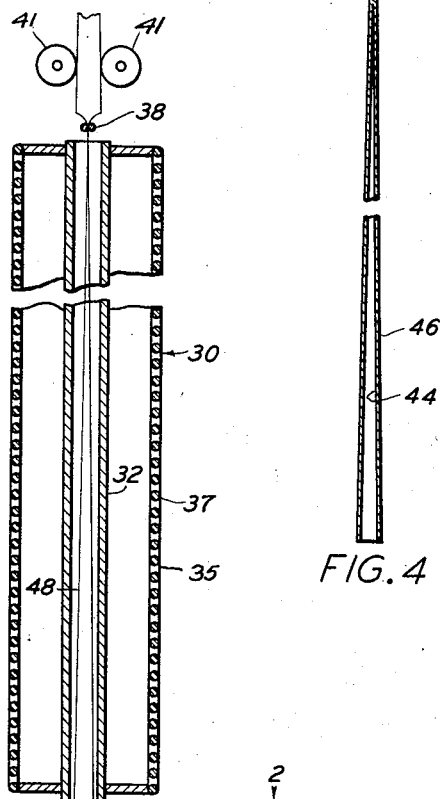
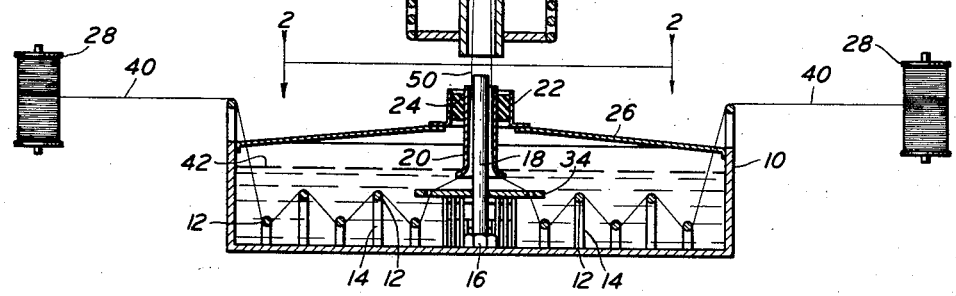
INVENTOR.
SAMUEL M. SHOBERT
BY
George A. Gust
ATTORNEY Sept. 16, 1958     S. M. SHOBERT     2,852,425
HOLLOW GLASS ROD AND METHOD OF MAKING SAME
Filed Sept. 7, 1954     2 Sheets-Sheet 2

INVENTOR.
SAMUEL M. SHOBERT
BY
George A. Gust
ATTORNEY

United States Patent Office 2,852,425
Patented Sept. 16, 1958

2,852,425

HOLLOW GLASS ROD AND METHOD OF MAKING SAME

Samuel M. Shobert, Walkerton, Ind.

Application September 7, 1954, Serial No. 454,569

10 Claims. (Cl. 154—91)

The present invention relates to glass-reinforced plastic rod, and to the method and apparatus for fabricating such rod.

The art involving glass-reinforced plastic rod is of very recent origin, and attended with considerable developmental work along the lines of providing different glass rod products as well as methods and apparatus of fabricating the same. According to Meek Patent No. 2,684,318, a plurality of glass threads are continuously passed longitudinally through a bath of heat-hardenable liquid resin and thereafter collected into a suitably shaped bundle which is cured by the use of heat. The resulting product is a solid rod which possesses considerable resiliency and which is especially adapted for use as fishing poles. Since the innovation of the glass fishing pole, there has been much said in the sporting world both for and against the glass fishing pole, the usual comparisons being made with the conventional bamboo rods. Some expert fishermen say that the glass rod is superior to the bamboo rod while others deny this superiority. However, in meeting the challenge of the critics, this new industry is striving constantly to devise different glass rod products as well as techniques of manufacture which will result in finished products which are regarded as being at least equal to and preferably superior to the old conventional fishing poles. It is fairly established at this time that the solid glass fishing rod commonly characterized as a "casting rod" is as good as and in almost all cases superior to the comparable bamboo casting rod. However, this acceptance is not carried over to the well-known "fly rods" whereupon the bamboo is in a scattered number of cases regarded as being superior to the comparable glass fly rod. This objection to the glass rod, however, is being overcome by further developmental work in the glass rod industry which is achieving glass-reinforced plastic rods of particular design in cross-section and in composition, such that the prior objections are no longer valid.

Moreover, research and developmental work is carrying the glass rod into direct competition both from cost and quality standpoints with the conventional bamboo cane pole largely used for "still fishing." By following certain manufacturing techniques and processes, completely satisfactory glass rod products are achieved which are directly competitive to the bamboo pole. In reaching this competitive status, it must be understood that the new glass pole must be substantially equivalent from operational, cost and quality standpoints, and in almost all cases possess characteristics which are superior to those of the conventional poles. As will appear from the following description, the present invention provides an apparatus, method and a product which are directly competitive and superior to the prior bamboo products.

In view of the foregoing, it is an object of this invention to provide a method of fabricating a hollow glass-reinforced plastic rod possessing elasticity characteristics adapted especially for fishing poles.

It is another object of this invention to provide a unique method of fabricating in a single operation a hollow tapered glass-reinforced plastic rod.

It is still another object of this invention to provide the product of the aforementioned object which is a tapered hollow glass-reinforced plastic rod.

It is still another object of this invention to provide an apparatus for producing hollow glass-reinforced plastic rod.

In accordance with one aspect of this invention, the method of making hollow tapered glass rod comprises the steps of wetting a plurality of glass threads with heat-hardenable resin material, gathering all of said threads into a conically-shaped bundle which is hollow, this hollow center being tapered in substantial conformity with the taper of the bundle exterior, tensioning all of the threads in said bundle, and curing the resin during said tensioning step.

For a better understanding of the invention, together with other and further objects thereof, reference is made to the following description taken in connection with the accompanying drawings, the scope of the invention being defined by the appended claims.

In the drawings:

Fig. 1 is a sectional illustration of one embodiment of this invention;

Fig. 3 is a top plan view of one part of the apparatus of Fig. 1; and

Fig. 4 is a tapered hollow glass-reinforced plastic rod which is fabricated by use of the apparatus and methods of this invention.

Figure 2:
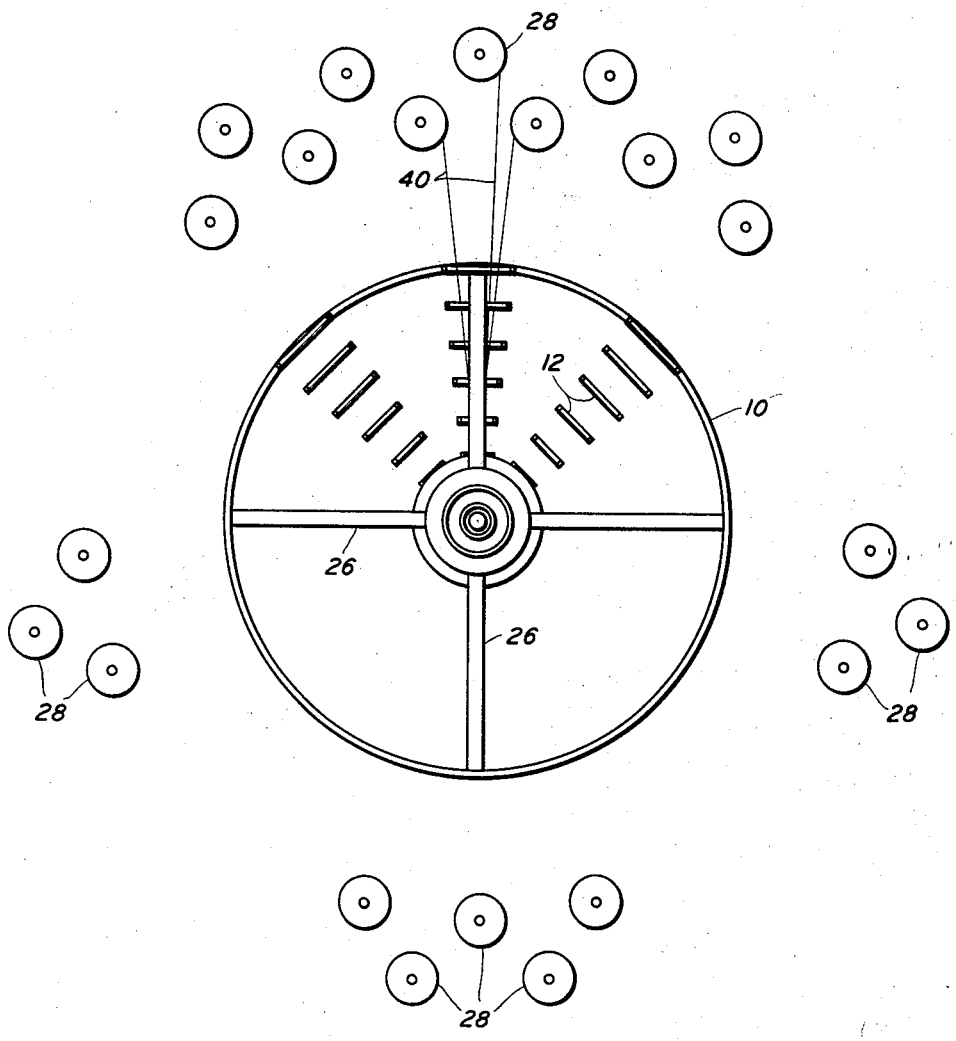
Fig. 2 is a top plan view taken substantially along section line 2—2 of Fig. 1.

The glass thread and resin materials used in this invention are now conventional in the art of fabricating glass fishing rods. These materials may be the same as those used in the product and process described in the Meek Patent No. 2,684,318, issued July 20, 1954; Kock Patent No. 2,625,498, issued January 13, 1953, and the Modern Plastics publication of February 1946, pages 124–125. While these prior art publications are mentioned primarily for the purpose of providing a source of information for determining the materials used in following the method of this invention, brief reference to the three publications will also reveal that the Meek patent provides a process which is continuously moving, that is to say, glass rod is continuously being produced without interruption. The Koch patent describes a method commonly characterized as the "batch method" wherein the operation is discontinuous and rod is made in discrete sections according to repetitive cycles. The Modern Plastics publication discloses a method of combining glass-reinforced plastic with a soft wood core for producing a finished rod having an action quite similar to the comparable bamboo fishing rod. As will appear from the following description, this invention significantly differs from these representative prior art methods, and achieves a product which is different.

With reference to the drawings, and more particularly to Fig. 1, a circular tank 10 carries on its bottom a plurality of radially spaced rollers 12 which converge at the central portion of the tank. Fig. 2 clearly illustrates this radial relationship of the rollers 12. The rollers 12 in each radial row are alternated in height, as appears in Fig. 1, and are suitably supported by rigid uprights 14. A nut 16 is suitably secured to the bottom center of the tank 10 as shown to receive the core rod 18 in vertical position. A tubular die 20 coaxially surrounds and is spaced from the die rod 18, and is flared at the bottom end for a purpose which will become apparent from the following description. The die tube 20 is supported by means of a suitable sleeve 22 and a plastic material 24 which may be of any suitable composition as will rigidly secure the sleeve 22 and tube 20 together. This die 18, 20 is supported with respect to the tank 10 by means of a spider supporting frame 26 which is secured at its center portion to a horizontal flange of the sleeve 22 and at its outer portion to the inner wall of the tank 10 as shown. It is important, as will appear from the following, that the core 18 and die 20 be substantially vertical, and that sufficient spacing between the core 18 and die 20 be provided for passing a plurality of resin impregnated glass threads therebetween.

Circumferentially arranged around the tank 10 are a multiplicity of spools of glass thread 28 (Fig. 2) which are supported for free rotation much in the same manner as the spools described in Meek Patent No. 2,684,318.

Vertically arranged immediately above the central portion of the die 18, 20 is the resin-curing section of the apparatus which comprises an oven 30 composed of a tubular inner portion 32 and an outer casing 35 which carries suitable heating elements, such as electrical heating wires 37. The opposite ends of the oven tube 32 are open such that a bundle of glass thread may be continuously drawn therethrough without interruption. This oven 30 is spaced above the die 18, 20 a short distance and is preferably coaxial therewith.

Immediately above the oven 30 is a driving mechanism of the character described in the Meek Patent No. 2,684,318 which comprises two driven rollers 32 for drawing a bundle of glass threads through the apparatus, as will be explained in the following.

Immediately below the bottom end of the die tube 20 is positioned a thread-distributing disc 34 which is secured to the die core 18. This disc 34 is provided with a plurality of circumferentially and radially spaced thread-receiving apertures 36 which determine the distribution of the glass threads in the finished rod product.

Thread from each spool 28 is passed over and under alternate rollers 12 as shown in Fig. 1 and pass through respective apertures 36 in the thread-distributing disc 34 and through the bundling die between the core 18 and outer tube 20. The threads are further drawn through the inner oven tube 32 to converge at point 38, this convergence being accomplished by using some means of pinching the threads together, such as a string or rubber band. A tie of a string at point 38 is actually used in carrying out this process and is found to be entirely satisfactory. Other means of securing the strands together at point 38 may be used without departing from the scope of this invention.

With threads 40 being fed from around the entire circumference of the tank 10 radially inwardly through the thread-distributing disc 34 and through the die 18, 20, such threads are maintained under tension at all times by means of the driving mechanism 41 which is arranged to exert a pulling or tensioning force on the strands at all times.

A liquid resin material 42 is carried in the tank 10 above the level of the rollers 12 and just covering the lower end of the die tube 20. As the threads 40 are drawn through the tank, they obviously will be wet with the plastic 42 and by reason of passing alternately over and under the rollers 12 and being tensioned, any air which may be entrained in or adhered to the threads will be excluded therefrom. Further, as the threads pass through the apertures 36 of the disc 34, any air which may be on the surface thereof will be squeezed or rubbed off, as will occur at the mouth of the die tube 20. Thus, as the glass threads leave the bath to enter the die 18, 20, no air will be entrapped or adhered to the surface of the wetted strands, thereby preventing air from being included in the finished product.

A sufficient number of spools 28 are used such that as the threads converge at the mouth of the tube 20 they will solidly concentrate into a tubular form. The die core 18 serves in the formation of hollow interior 44 of the finished rod (Fig. 4), while the die tube 20 serves in determining the outer shape 46 of the rod.

In operation, the threads are drawn into the conically-shaped bundle 48, as illustrated in Fig. 1, by means of the driving mechanism 41 whereby the threads composing the bundle are all maintained in tension. This tensioning is important because it imparts the resiliency characteristics to the rod which are so desirable in fishing poles. Since the tip end of the bundle 48 is pinched together at 38, the bundle automatically conforms to the illustrated tapered shape and is conically hollow. It will be noted that no core is used for achieving this conical hollow nor is any mold used on the exterior of the rod during the formation or curing thereof. The entire shaping is achieved by use of the tensioning and tieing just described and the fact that the bundle 48 is arranged vertically. This vertical positioning is important since any other position will not provide the straightness and uniformity of the finished product as is desired. When the bundle 48 is pulled to the illustrated position with the tip end 38 adjacent the upper end of the oven 30, the driving mechanism 41 is stopped, thereby positioning the bundle 48 inside the oven. Heat from the oven is applied to the bundle 48 for curing the resin. Following this curing, the driving mechanism 41 is operated to draw the cured bundle through the oven to position a succeeding tapered bundle for curing. Since the base portion 50 (Fig. 1) of the bundle assumes the position of the apex of the preceding bundle, the threads depending from this base portion must be converged or tied together to provide a new apex or tip end. When this is done, the internal and external shapes of the bundle are automatically provided. Thus, this process may be characterized as being "semi-continuous" as distinguished from the continuous process of the Meek Patent No. 2,684,318 or the batch process of the Koch Patent No. 2,625,498. In the final fabrication, the individual tapered bundles of the finished chain of bundles are separated into discrete pieces which are thereafter ground and further processed into a merchandisable product.

While there has been described what is at present considered as the preferred embodiment of this invention, it will be obvious to those skilled in the art that various changes and modifications may be made therein without departing from the invention, and it is therefore intended in the appended claims to cover all such changes and modifications as fall within the true scope of the invention.

What is claimed is:

1. The method of making hollow tapered glass rod comprising the steps of wetting a plurality of glass threads with a heat-hardenable resin material, gathering all of said threads into an elongated tubular form, pinching said threads together at one end for forming a conically-shaped bundle which is hollow, tensioning all of said threads in said bundle, and curing said resin during said tensioning.

2. The method of making hollow tapered glass rod comprising the steps of wetting a plurality of glass threads with a heat-hardenable resin material, pulling all of said threads into a tubular bundle, securing the threads together at the end of said bundle for forming a conically-shaped bundle which is hollow, excluding air from said bundle such that the latter is composed of glass threads and resin only, tensioning all of said threads in said bundle, and curing said resin during said tensioning.

3. The method of making hollow tapered glass rod comprising the steps of wetting a plurality of glass threads with a heat-hardenable resin material, tensioning said threads into an elongated bundle which is hollow, holding the threads together at a point near one end of said bundle while under tension, and curing said resin during said tensioning.

4. The method of making hollow tapered glass rod comprising the steps of drawing a plurality of glass threads through a bath of heat-hardenable resin, excluding air from the resin covered threads, tying said threads together at one point, forming a hollow, tapered bundle of threads, supporting said hollow bundle under tension in a vertical position, and curing said bundle while in said vertical position and under tension for adhering all of said threads into a single tapered hollow rod.

5. The method of making hollow tapered glass rod comprising the steps of drawing a plurality of glass threads through a bath of heat-hardenable resin, gathering said threads into a tapered coreless bundle which is hollow, said gathering being performed in free space without the use of any internal shaping forms, said gathered bundle having substantially the shape and size of the finished product, supporting said bundle under tension, said hollow being tapered in substantial conformity with the taper of the bundle exterior, and curing said bundle under tension for adhering all of said threads into a single tapered hollow rod.

6. The method of making hollow tapered glass rod comprising the steps of passing a plurality of radially arranged threads longitudinally and radially inwardly through a bath of heat hardenable resin, said radial threads being disposed horizontally, collecting said threads into a bundle of annular cross-section at the convergence of said radial threads, drawing said threads longitudinally and vertically after said collecting step, thereby forming an elongated bundle of annular cross-section, maintaining said threads in tension, collapsing said threads at a given point for tapering said bundle, and curing said resin while the bundle is in the same tapered shape.

7. The method of making hollow tapered glass rod comprising the steps of drawing a plurality of resin-wetted threads into a hollow tapered bundle, curing the resin in said bundle to form a solidified rod, drawing said rod and appended resin-wetted threads into a tubular form, and converging the latter threads at a point adjacent the base of the first bundle to form a second tapered hollow bundle.

8. The method of making a hollow, tapered glass rod comprising the steps of wetting a plurality of glass threads with resin, forming said threads into a tubular bundle, securing all of said threads together at a point near one end of said bundle, tensioning said threads whereby a hollow, tapered bundle is formed, and curing the resin while said bundle is maintained in its tapered form.

9. The method of making a hollow, tapered glass rod comprising the steps of wetting a plurality of glass threads with resin, securing said threads together at a single point, drawing said threads into a hollow, tapered bundle having an apex at said point, the size and shape of said tapered bundle conforming to that of the finished product, and curing said resin for bonding said threads together.

10. The method of making successive lengths of hollow, tapered glass rod comprising the steps of assembling the end portions of a plurality of resin-wetted glass threads into a first hollow, tapered bundle, curing said first bundle, securing the threads at the base of said first bundle together, forming the next succeeding length of said threads into a second hollow tapered bundle, and curing the said second bundle.

References Cited in the file of this patent

UNITED STATES PATENTS

| | | |
|---|---|---|
| 2,290,386 | Schindler | July 21, 1942 |
| 2,373,078 | Kleist | Apr. 3, 1945 |
| 2,397,141 | Holtje | Mar. 26, 1946 |
| 2,571,692 | Dubois | Oct. 16, 1951 |
| 2,571,717 | Howald et al. | Oct. 16, 1951 |
| 2,625,498 | Koch | Jan. 13, 1953 |
| 2,654,685 | Voelker | Oct. 6, 1953 |
| 2,694,661 | Meyer | Nov. 16, 1954 |
| 2,726,185 | Howald | Dec. 6, 1955 |
| 2,751,320 | Jacobs et al. | June 19, 1956 |

OTHER REFERENCES

Modern Plastics; February 1946; pp. 124 and 125.